Patented Aug. 18, 1953

2,649,477

UNITED STATES PATENT OFFICE 2,649,477

PROCESS FOR THE MANUFACTURE OF MALEIC ACID

David Ian Hutchinson Jacobs, Carshalton, David James Hadley, Epsom Downs, and Robert Heap, Sutton, England, assignors to The Distillers Company Limited, Edinburgh, Scotland, a British company No Drawing. Application December 4, 1950, Serial No. 199,146. In Great Britain December 9, 1949

9 Claims. (Cl. 260—533)

The present invention relates to an improved process for the manufacture of maleic acid by the oxidation in the vapour phase of organic compounds containing 4–8 carbon atoms.

It is known that maleic anhydride can be prepared by the vapour phase oxidation of butenes and related compounds at temperatures of about 250° C. to 400° C. using air in excess of that required for complete combustion to carbon dioxide and water vapour, over suitable catalysts such as oxides or salts of vanadium, bismuth, molybdenum, uranium, tungsten, chromium and manganese.

A further method for the production of maleic acid and maleic anhydride comprises the oxidation of these compounds in the presence of substantial amounts of water vapour, which may be used in partial substitution for the nitrogen or other diluents in the air, or other oxygen-containing gases used. As catalysts for this process have been described the complex mixed salts of molybdic acid which contain 2 or more basic oxides which are preferably of different groups of the periodic system, such for example as tin boromolybdate, ferric boromolybdate, ferric vanadomolybdate, manganese aluminomolybdate, uranyl vanadomolybdate and chromium sulphomolybdate. It is stated that these materials may also be distributed on suitable carriers, such as alumina or pumice, if desired, with the addition of binding agents such as oxalic acid.

It is also known that maleic acid and maleic anhydride can be prepared by the vapour phase oxidation of aliphatic and aromatic compounds of 4 or more carbon atoms in the presence of a catalyst containing vanadium pentoxide, molybdenum trioxide and phosphorus pentoxide.

The above known processes have given poor yields.

The principal object of the present invention accordingly is to provide a simple, efficient process of the kind described in which the yields of maleic acid are improved.

The invention accordingly comprises the novel processes and steps of processes, specific embodiments of which are described hereinafter by way of example and in accordance with which we now prefer to practice the invention.

We have found in accordance with our invention that improved yields of maleic acid can be obtained by subjecting an organic compound, preferably an unsaturated hydrocarbon compound, of 4 to 8 carbon atoms in the vapour phase to a molecular oxygen-containing gas in the presence of a catalyst containing oxides of phosphorus and molybdenum in combination. From such oxidation catalyst, vanadium is excluded since the presence of vanadium and its compounds in the catalyst has been found to be deleterious and does not give the desired yield. The combination of phosphorus and molybdenum in the oxidation catalyst mentioned may or may not be a chemical combination. The hydrocarbon is oxidised in accordance with our process to produce maleic acid with relatively high yield. Suitably, a gas mixture containing the organic compound to be oxidised is passed over a catalyst comprising a molybdenum oxide-phosphorus-oxide complex at temperatures between 250° C. and 400° C. so as to produce maleic acid or maleic anhydride, and recovering the maleic acid and/or maleic anhydride from the reaction products in the conventional way. The gas mixture should preferably contain oxygen in excess of that required for the complete oxidation of said organic compounds.

In the oxidation of organic compounds in accordance with the process of the present invention, the reaction product obtained will contain maleic acid and/or maleic anhydride. It is to be noted that the references in the specification and claims to maleic acid are to be understood as covering maleic acid and/or maleic anhydride.

The process of the present invention is of particular application in the conversion of unsaturated hydrocarbons of 4 carbon atoms—for example butenes and butadiene, and is suitably applied to the oxidation of the butene fractions, which may contain a mixture of 1-butene and 2-butene, obtained in processes for the cracking of petroleum oils. It is to be noted that the reaction product obtained according to the present invention may contain appreciable quantities of valuable byproducts, such as acetic acid and crotonaldehyde.

In the oxidation of these compounds it is preferred that the gas feed comprises air which contains less than 5% by volume and preferably 1% to 2% by volume of the vapourised organic compound to be oxidised.

The oxidation catalyst employed in the present invention preferably comprises the molybdenum-phosphorus oxide compound supported on a suitable carrier such, for example, as silica gel, alumina and the like. The preferred catalyst carrier is silica gel. The catalyst may be prepared by adding phosphoric acid to the solution or suspension of molybdic acid with which the catalyst carrier is impregnated. Definite chemical compounds such as phosphomolybdic acid or ammonium phosphomolybdate may also be used. It is preferred that the atomic ratio between molybdenum and phosphorus in the finished catalyst is of the the order of about 12:1, although it is to be noted that this ratio may vary considerably.

The catalyst which it is preferred to employ for the process of the present invention can be prepared by contacting hydrated silica gel with an aqueous solution containing phosphate and molybdate ions, and thereafter drying the resulting mixture, which may be ground, pelleted or formed in any other suitable way. By the term "hydrated silica gel" is meant silica gel obtained by precipitation from aqueous solution which has not been subjected to an irreversible drying process. The molybdate and phosphate ions present in the aqueous solution become absorbed on the hydrated silica gel, and on subsequent heating in the presence of air or oxygen, are converted to phosphorus oxide and molybdenum oxide respectively, which may or may not be in chemical combination. This catalyst may also be prepared by contacting the hydrated silica gel with an aqueous solution of phosphoric acid and molybdic acid, or with an aqueous solution of phosphoric acid and ammonium molybdate, thereafter drying the so impregnated silica gel.

The following examples are given to illustrate the process of the present invention. The percentages quoted are by weight unless otherwise indicated.

Example 1

An oxidation catalyst is prepared by dissolving 23.2 grams of ammonium molybdate in 20 millilitres of water and adding to this solution an aqueous solution comprising 1.14 grams of phosphoric acid in 10 millilitres of water. 20 grams of silica gel are soaked in this mixture for half an hour after which time the excess liquid is drained off and the catalyst dried at 100° C. and finally heated in a stream of air at 320° C. for 1 hour.

A gaseous mixture comprising air containing 2% by volume of a mixture of 1- and 2-normal butenes is passed at the rate of 25 litres per hour over 8 grams of the catalyst prepared as described above at a temperature of 320° C.

The reaction product is recovered in the usual way and it is found that the product contains 26% maleic acid, 8% acetic acid, 9% crotonaldehyde and 4% acetaldehyde based on the butenes fed to the reactor.

For comparative purposes when repeating the process of this example under identical conditions using the catalyst shown in column 1 of the table below in place of the catalyst used above, the yields of maleic acid and the other products of the oxidation are low as is shown by the results given below.

| Catalyst | Analysis of product as percent based on amount of n-butene fed to the reactor | | | |
|---|---|---|---|---|
| | Maleic Acid | Acetic Acid | Croton-aldehyde | Acetal-dehyde |
| (1) Molybdenum oxide-silica gel catalyst | 10 | 8 | 8 | 8 |
| (2) Nickel-molybdenum oxides silica gel catalyst | 1 | 0 | (¹) | (¹) |
| (3) Chromium oxide silica gel catalyst | (¹) | (¹) | (¹) | (¹) |
| (4) Tungstenoxide silica gel catalyst | (¹) | (¹) | (¹) | (¹) |
| (5) Vanadium oxide silica gel catalyst | 4 | 6 | 6 | 6 |
| (6) Uranium oxide silica gel catalyst | (¹) | (¹) | (¹) | (¹) |

¹ Less than 1.

Example 2

200 grams of sodium metasilicate are dissolved in 3.5 litres of cold water and to the solution is added aqueous 25% phosphoric acid in amount just sufficient to render the mixture acid to methyl red, and on standing overnight silica gel separates. The mixture thus obtained is centrifuged, and the separated gel washed with water. A solution of 50 grams of ammonium molybdate and 12 ml. of 2 N phosphoric acid in 60 ml. of water is added to the washed hydrated silica gel, and the mixture evaporated to dryness at 100° C. with constant stirring. The friable mass thus obtained is formed into ⅛ inch diameter pellets.

It is found that by passing a gaseous mixture comprising air containing 2% by volume of normal butene at a rate of 25 litres per hour over 16 grams of this catalyst at a temperature of 320° C., a yield of 30% of maleic acid, 15% of acetic acid and 9% of crotonaldehyde, based on the amount of normal butene fed to the reactor, is obtained. It was also found that after ten days continuous operation there had been no significant decline in the activity of the catalyst.

Example 3

8 grams of a phosphomolybdenum catalyst prepared as described in Example 2 are placed in a reactor and a gaseous mixture comprising air containing 2% by volume of butadiene is passed over it at a rate of 25 litres per hour, at a temperature of 320° C. The yield of maleic acid, based on the amount of butadiene fed to the reactor, is found to average 32%, even after 16 days continuous operation. An average yield of 10% of crotonaldehyde, based on the amount of butadiene fed to the reactor is also obtained.

Example 4

A gaseous mixture comprising air containing 2% by volume of a mixture of 1- and 2-normal butenes is passed at the rate of 25 litres per hour over 16 grams of a phospho-molybdic-silica gel catalyst prepared as in Example 1, at a temperature of 275° C. The reaction product is recovered in the usual way and is found to contain 23% maleic acid and 12% crotonaldehyde based on the butenes fed to the reactor.

Example 5

A gaseous mixture comprising 2% by volume of a mixture of 1- and 2-normal butenes and 98% by volume of a mixture of oxygen and steam in a 1:9 volume ratio, is passed at the rate of 25 litres per hour over 8 grams of a phospho-molybdic-silica gel catalyst prepared as in Example 1, at a temperature of 320° C. The reaction product is recovered in the usual way and is found to contain 26% maleic acid and 10% crotonaldehyde, based on the butenes fed to the reactor.

Example 6

A gaseous mixture comprising 1% by volume of normal butene in air is passed at the rate of 25 litres per hour over 16 grams of a phospho-molybdic-silica gel catalyst prepared as described in Example 2, at a temperature of 320° C. The oxidation was carried out in a continuous manner for 910 hours without interruption and the results obtained are given in the following table. The percentage yields of the products are based on the amount of normal butene fed to the reactor.

| No. of hours continuous operation | Percent yield of— | | |
|---|---|---|---|
| | Maleic acid | Acetic acid | Croton-aldehyde |
| 45 | 33 | 17 | 7 |
| 189 | 31 | 14 | 9 |
| 429 | 30 | 12 | 8 |
| 573 | 29 | 13 | 7 |
| 766 | 31 | 12 | 5 |
| 873 | 28 | 12 | 7 |
| 910 | 26 | 11 | 6 |

It will be seen from the results quoted above that even after 30 days continuous operation the catalyst activity had not diminished appreciably.

Example 7

200 grams of sodium metasilicate are dissolved in 3.5 litres of cold water and to the solution is added aqueous 25% phosphoric acid in amount just sufficient to render the mixture acid to methyl red, and on standing overnight silica gel separates. The mixture thus obtained is centrifuged, and the separated gel washed with water. A solution of 50 grams of ammonium molybdate and 18 ml. of 2 N. phosphoric acid in 60 ml. of water is added to the washed hydrated silica gel, and the mixture evaporated to dryness at 100° C. with constant stirring. The friable mass obtained is formed into ⅛ inch diameter pellets. The atomic ratio between molybdenum and phosphorus in the catalyst is 8:1.

A gaseous mixture comprising air containing 2% by volume of normal butene is passed at the rate of 25 litres per hour over 8 grams of this catalyst at a temperature of 320° C. and it is found that a yield of 20% maleic acid, 7% acetic acid and 8% crotonaldehyde based on the amount of normal butene fed to the reactor is obtained.

Example 8

200 grams of sodium metasilicate are dissolved in 3.5 litres of cold water and to the solution is added aqueous 25% phosphoric acid in amount just sufficient to render the mixture acid to methyl red, and on standing overnight silica gel separates. The mixture thus obtained is centrifuged, and the separated gel washed with water. A solution of 50 grams of ammonium molybdate and 6 ml. of 2 N. phosphoric acid in 60 ml. of water is added to the washed hydrated silica gel, and the mixture evaporated to dryness with constant stirring. The friable mass thus obtained is formed into ⅛ inch diameter pellets. The atomic ratio between molybdenum and phosphorus in the catalyst is 24:1.

A gaseous mixture comprising air containing 2% by volume of normal butene is passed at the rate of 25 litres per hour over 8 grams of this catalyst at a temperature of 320° C., and it is found that a yield of 30% maleic acid, 14% acetic acid and 10% crotonaldehyde, based on the amount of normal butene fed to the reactor, is obtained.

We claim:

1. A process for the manufacture of maleic acid, which comprises oxidising an unsaturated aliphatic compound of 4 to 8 carbon atoms in the vapour phase by means of a molecular oxygen-containing gas in the presence of a catalyst comprising the oxides of phosphorus and molybdenum, said catalyst being substantially free from vanadium and its compounds.

2. A process which comprises subjecting an aliphatic unsaturated hydrocarbon of 4 carbon atoms in the vapour phase to a molecular oxygen-containing gas in the presence of a catalyst comprising the oxides of phosphorus and molybdenum and free from vanadium and its compounds, and oxidising the hydrocarbon compound to produce maleic acid.

3. A process as in claim 2, wherein the oxidation is carried out at a temperature in the range 250° C.–400° C.

4. A process as in claim 2, wherein the catalyst is supported on silica gel.

5. A process as in claim 2 wherein the atomic ratio of molybdenum to phosphorus is about 12 to 1.

6. A process which comprises passing a gas mixture containing air with a 1% to 5% by volume of an aliphatic unsaturated hydrocarbon of 4 carbon atoms, in the vapour phase, over a catalyst comprising the oxides of phosphorus and molybdenum and free from vanadium and its compounds, oxidising the hydrocarbon to produce a maleic acid.

7. A process for the manufacture of maleic acid, which comprises oxidising an unsaturated hydrocarbon of 4 carbon atoms in the vapour phase by means of a molecular-oxygen containing gas in the presence of a catalyst prepared by contacting hydrated silica gel with an aqueous solution containing phosphate and molybdate ions and thereafter drying the resulting mixture, said catalyst being substantially free from vanadium and its compounds, and recovering the maleic acid from the treated gases.

8. A process as in claim 7, wherein the atomic ratio of molybdenum to phosphorus in said catalyst is about 12 to 1.

9. A process which comprises forming a mixture of air and a substance selected from the group consisting of butene and butadiene and passing the mixture heated to a temperature of about 320° C. over a catalyst consisting of the oxides of phosphorus and molybdenum.

DAVID IAN HUTCHINSON JACOBS.
DAVID JAMES HADLEY.
ROBERT HEAP.

References Cited in the file of this patent

UNITED STATES PATENTS

| Number | Name | Date |
|---|---|---|
| 2,079,490 | Conover | May 4, 1937 |
| 2,097,904 | Walters | Nov. 2, 1937 |
| 2,260,409 | Slotterbeek et al. | Oct. 28, 1941 |
| 2,462,938 | Bludworth et al. | Mar. 1, 1949 |